Figure 24:
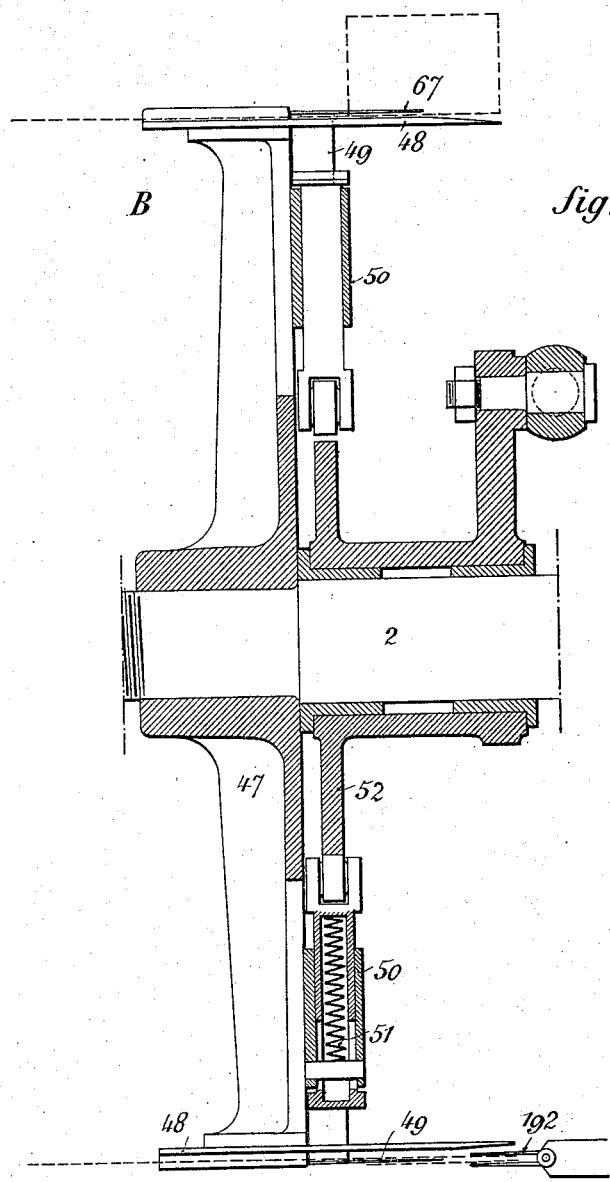

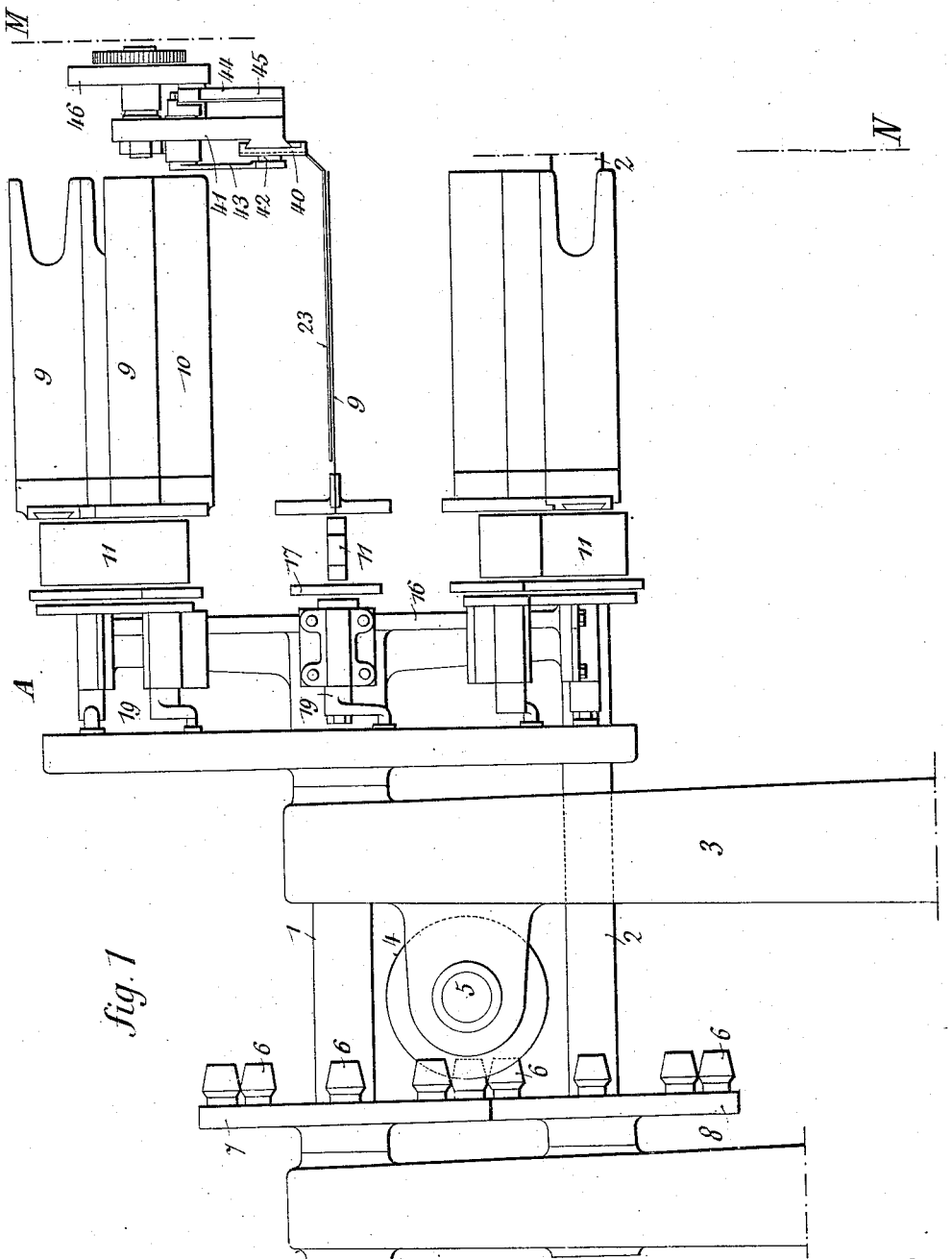

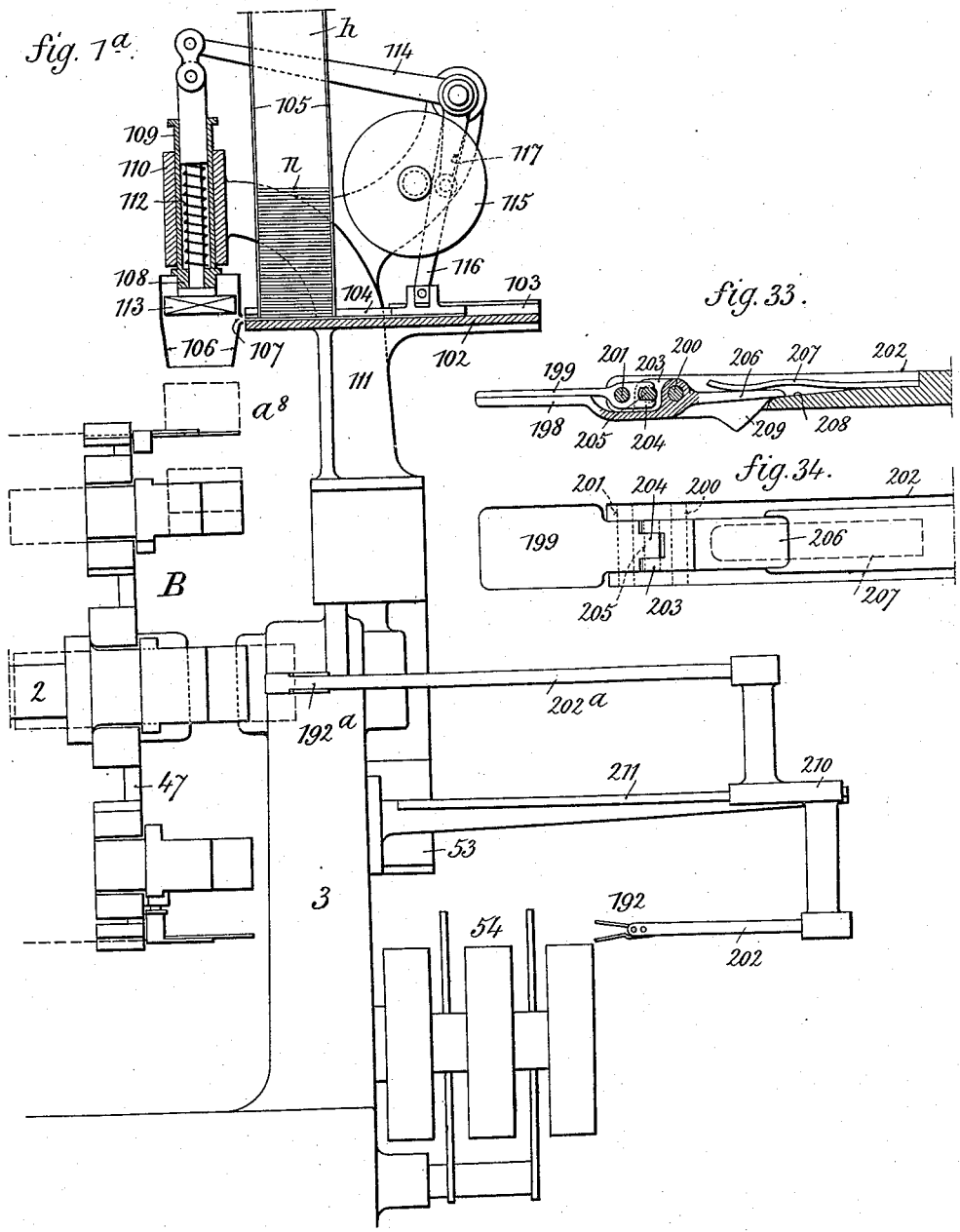

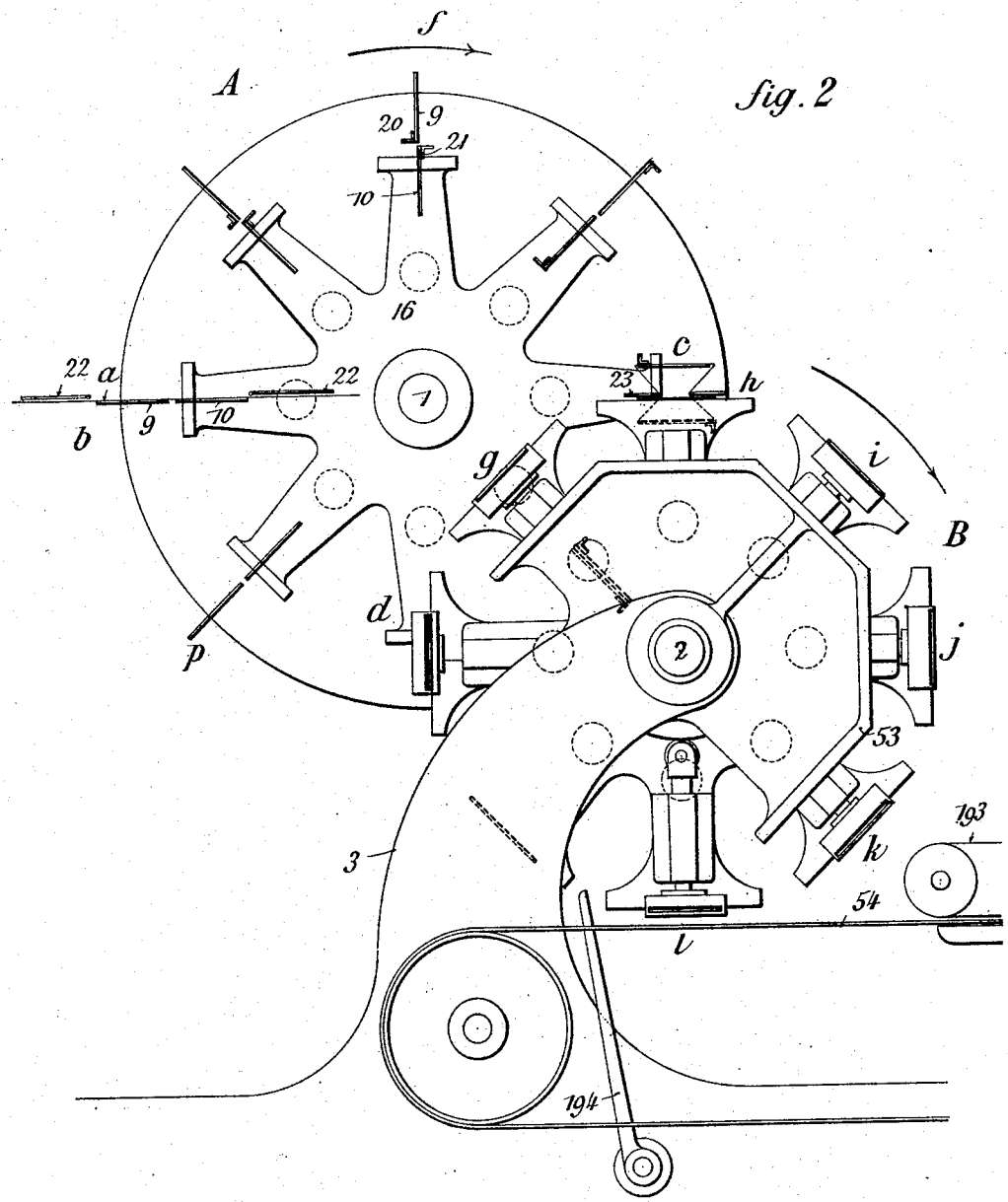

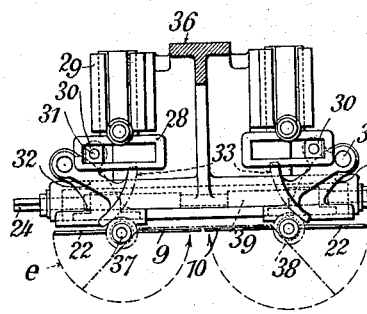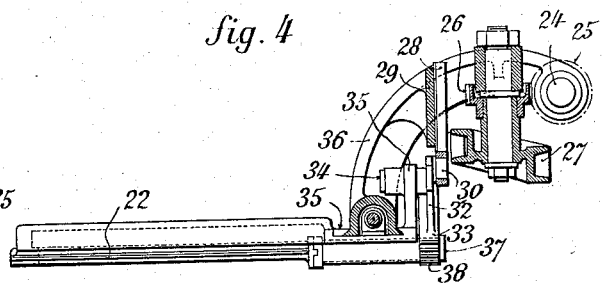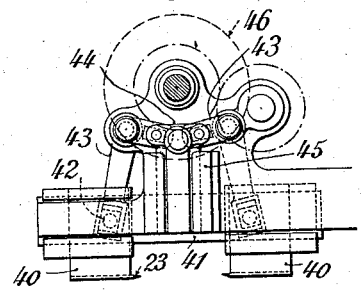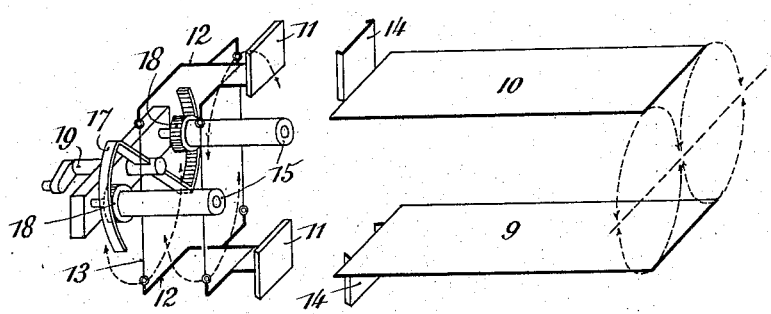

J. BARDET.
MACHINE FOR MAKING PAPER BAGS.
APPLICATION FILED JULY 17, 1913.
1,174,040.
Patented Mar. 7, 1916.
16 SHEETS—SHEET 5.
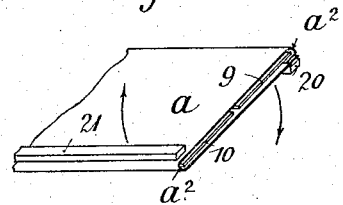
Fig. 11
Fig. 7
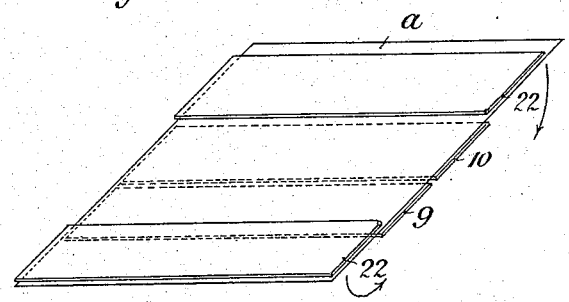
Fig. 12
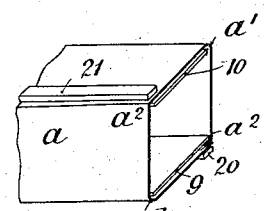
Fig. 8
Fig. 13
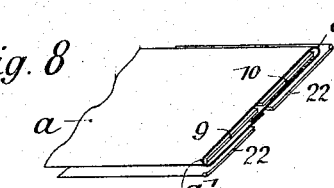
Fig. 9
Fig. 14
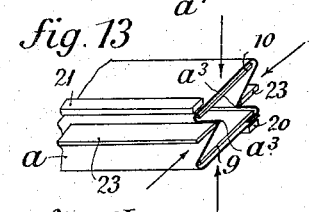
Fig. 10
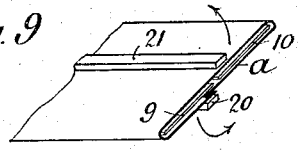
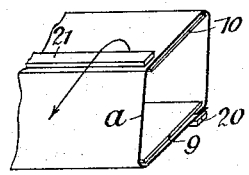
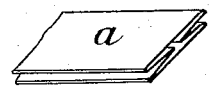
Witnesses—
Inventor—
Jean Bardet.
By his Attorneys—
Howson & Howson
THE COLUMBIA PLANOGRAPH CO., WASHINGTON, D. C.

J. BARDET.
MACHINE FOR MAKING PAPER BAGS.
APPLICATION FILED JULY 17, 1913.
1,174,040.
Patented Mar. 7, 1916.
16 SHEETS—SHEET 6.
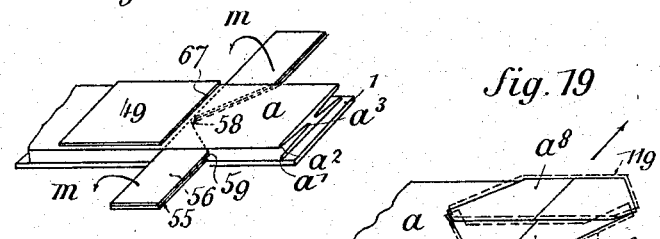
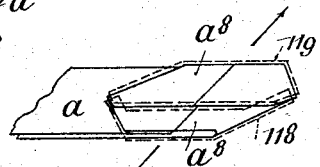
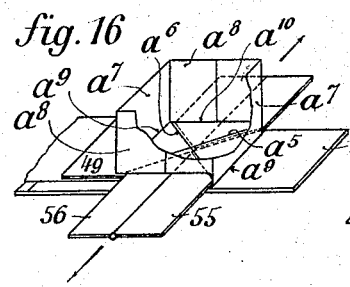
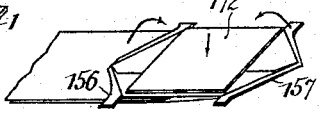
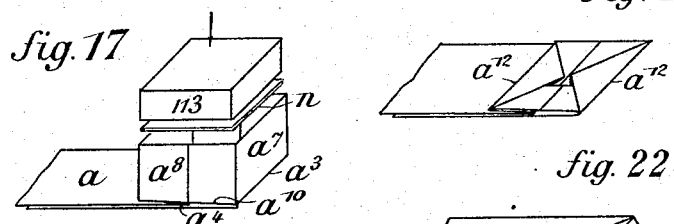
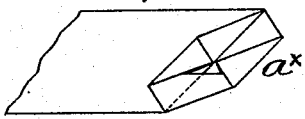
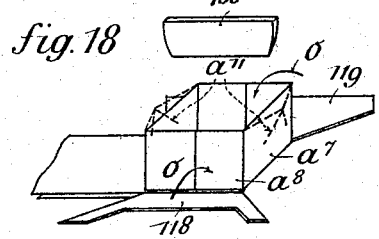
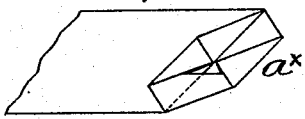

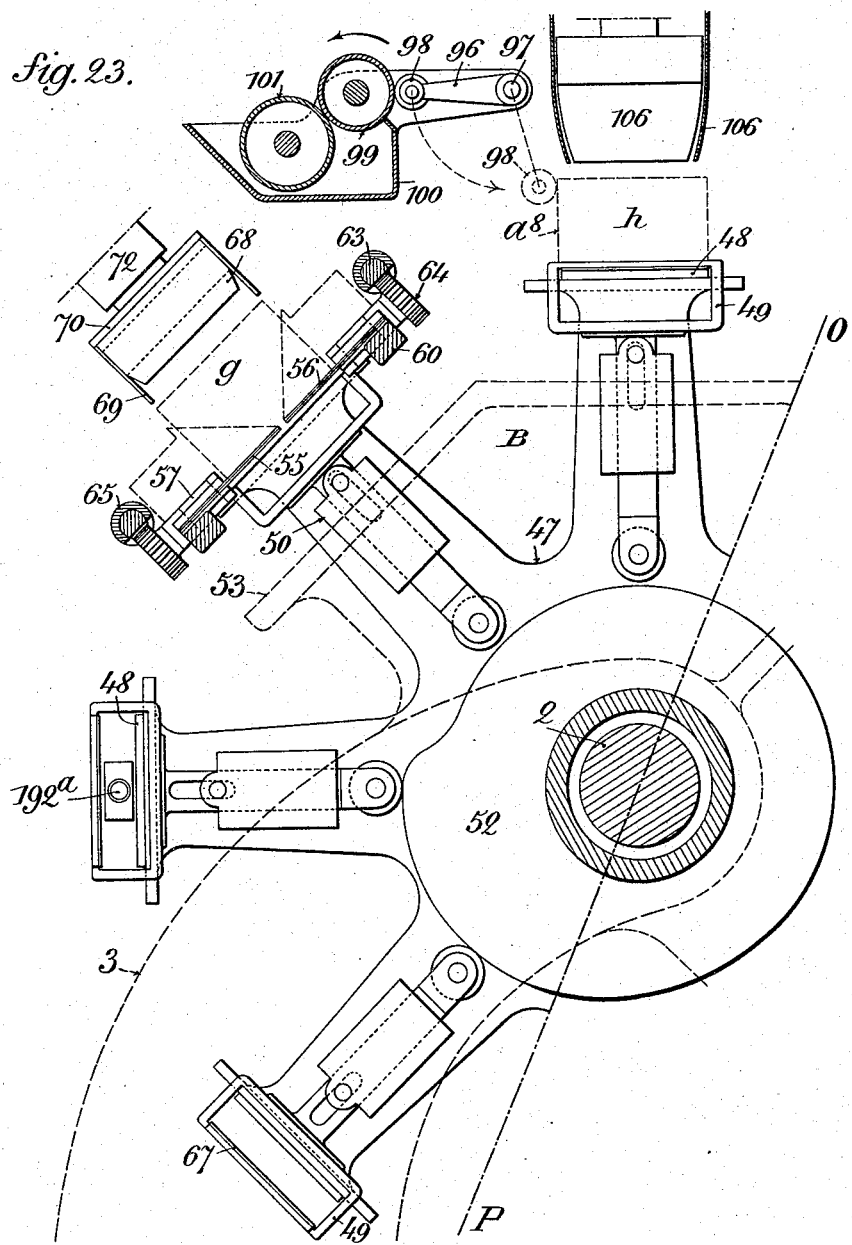

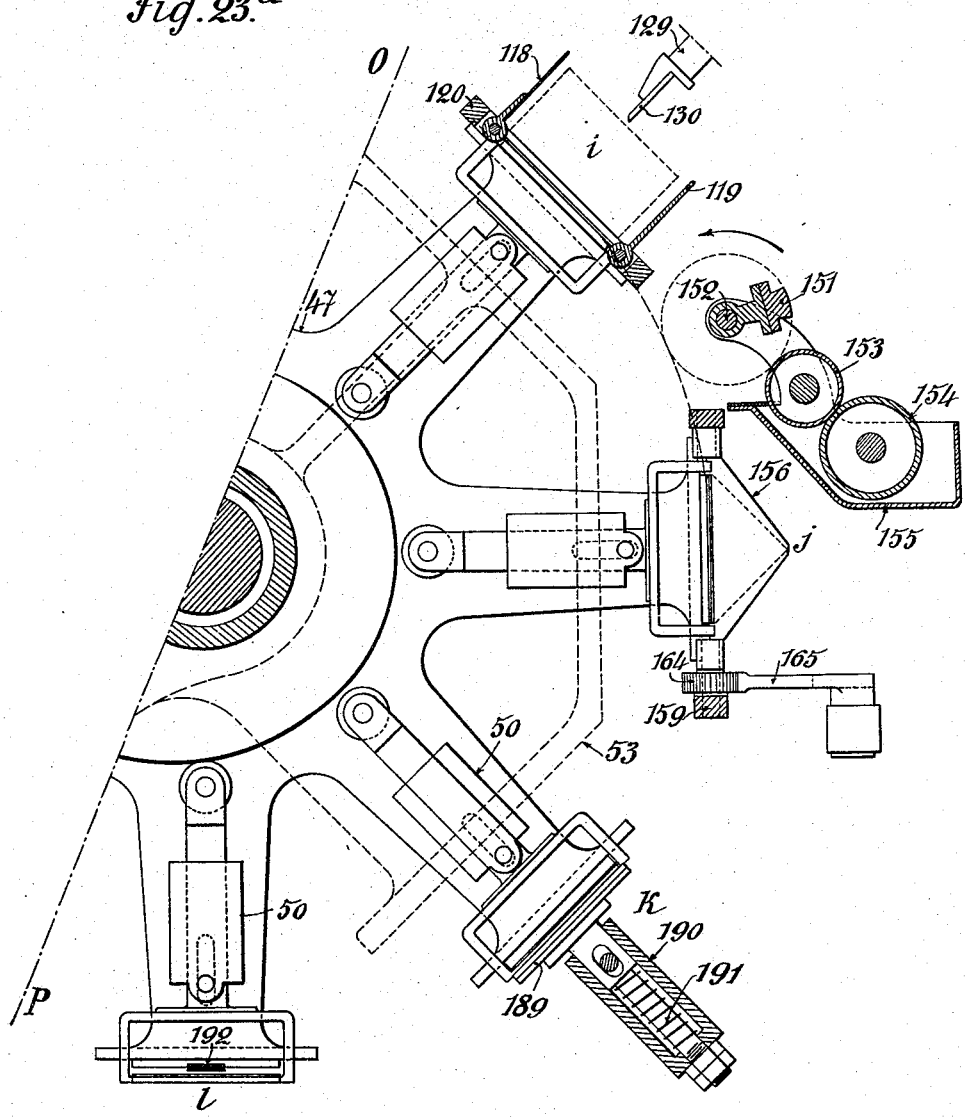

J. BARDET.
MACHINE FOR MAKING PAPER BAGS.
APPLICATION FILED JULY 17, 1913.

1,174,040.

Patented Mar. 7, 1916.
16 SHEETS—SHEET 13.

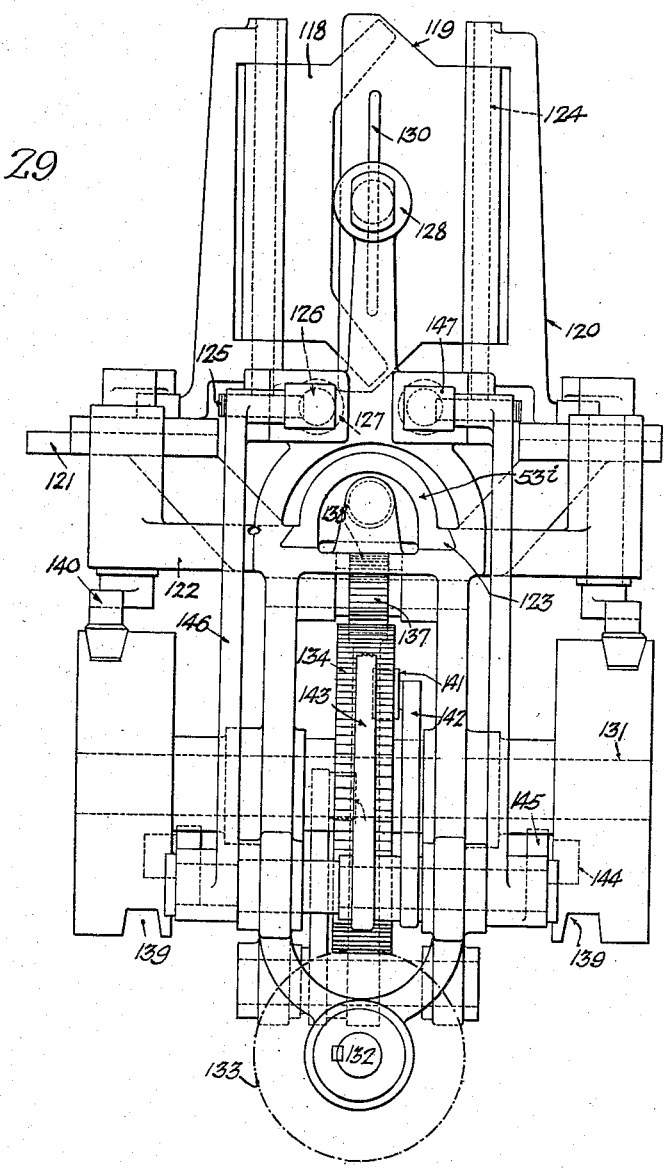

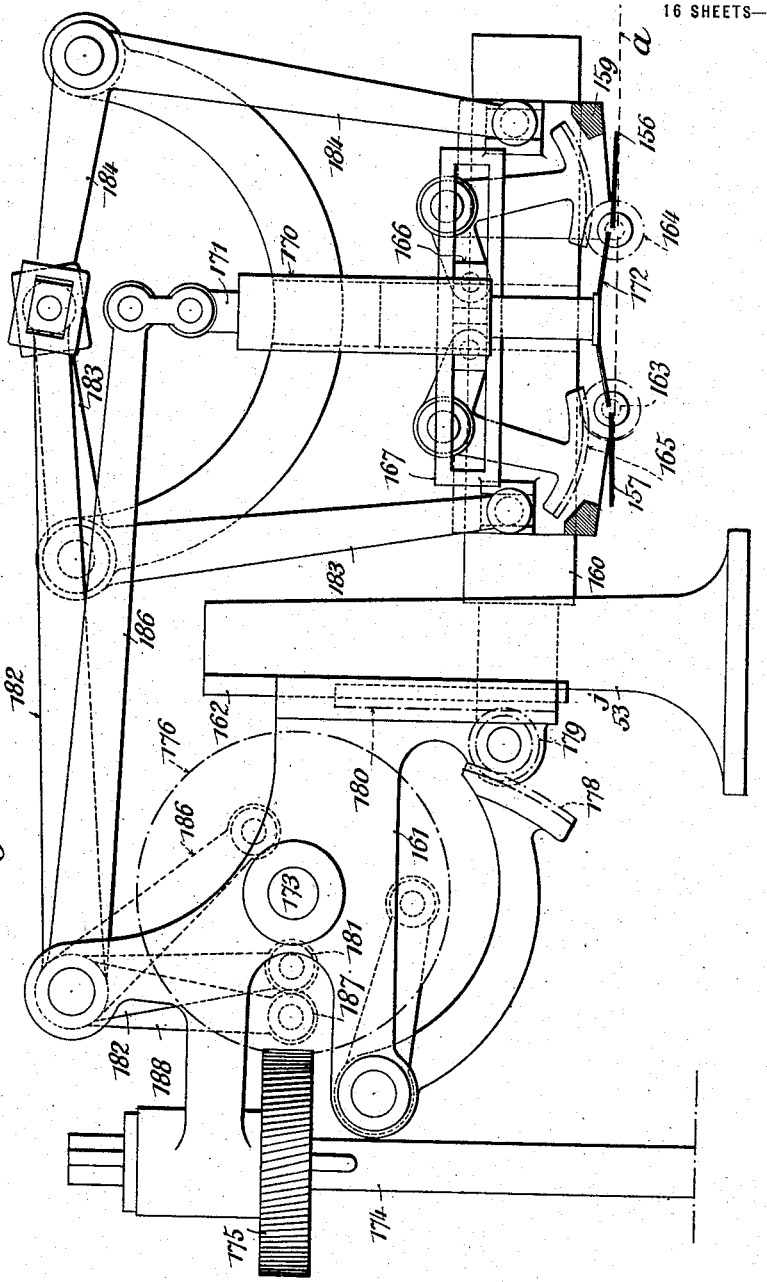

J. BARDET.
MACHINE FOR MAKING PAPER BAGS.
APPLICATION FILED JULY 17, 1913.
1,174,040.
Patented Mar. 7, 1916.
16 SHEETS—SHEET 16.
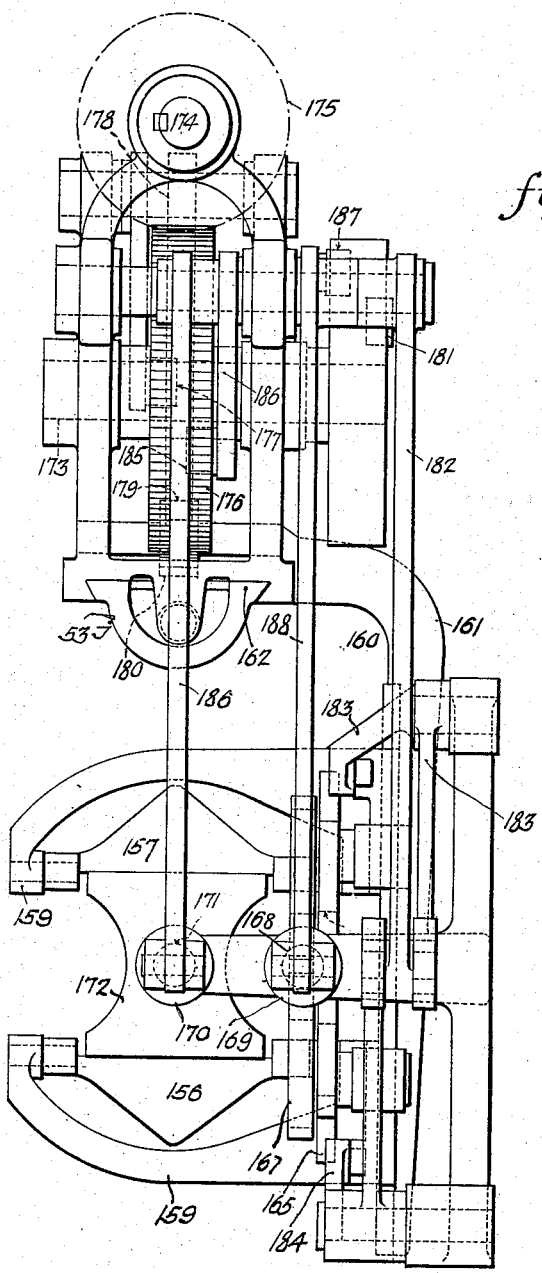

UNITED STATES PATENT OFFICE.

JEAN BARDET, OF PARIS, FRANCE, ASSIGNOR TO DOBSON, MOLLE & CO., LIMITED, OF EDINBURGH, SCOTLAND, A LIMITED COMPANY INCORPORATED UNDER THE BRITISH COMPANIES ACTS, 1862 TO 1898.

MACHINE FOR MAKING PAPER BAGS.

1,174,040.      Specification of Letters Patent.      Patented Mar. 7, 1916.

Application filed July 17, 1913. Serial No. 779,580.

*To all whom it may concern:*

Be it known that I, JEAN BARDET, a citizen of the Republic of France, residing at 35 Rue d'Alsace, Paris, in the Republic of France, engineer, have invented certain new and useful Improvements in Machines for Making Paper Bags, of which the following is a specification.

This invention has for its object to provide an improved machine for making paper bags, wherein each bag is made of a sheet of paper which has been previously cut to the required length and which can therefore be provided with any desired printing or decoration before entering the machine.

The improved machine is capable of making paper bags of two different kinds, namely, bags having square or rectangular bottoms, and bags having hexagonal bottoms, and also of making each of those kinds of bags in different sizes by simply changing and leaving out some of the tools.

The improved machine comprises essentially two sets of folding and pasting apparatuses arranged at fixed points around two plates or drums rotating on horizontal axles for conveying the paper sheets successively to the said apparatuses. The first drum is provided with folding appliances constructed in accordance with my earlier British Patent No. 22818 of A. D. 1912, for forming the sheets into tubes folded lengthwise. These tubes are then conveyed by automatic means upon the second drum where they are subjected successively to the action of the appliances of the second set of apparatus which form the bottoms of the bags by a series of suitable folding and pasting operations.

The present invention consists more particularly in the combination of apparatuses suitable for folding lengthwise rectangular sheets of paper previously cut to length for the purpose of forming them into flat tubes then by means of suitable apparatuses shaping one end of the said tubes to form the bottoms of the bags.

One construction of the improved machine is illustrated by way of example in the accompanying drawings in which:—

Figure 25:
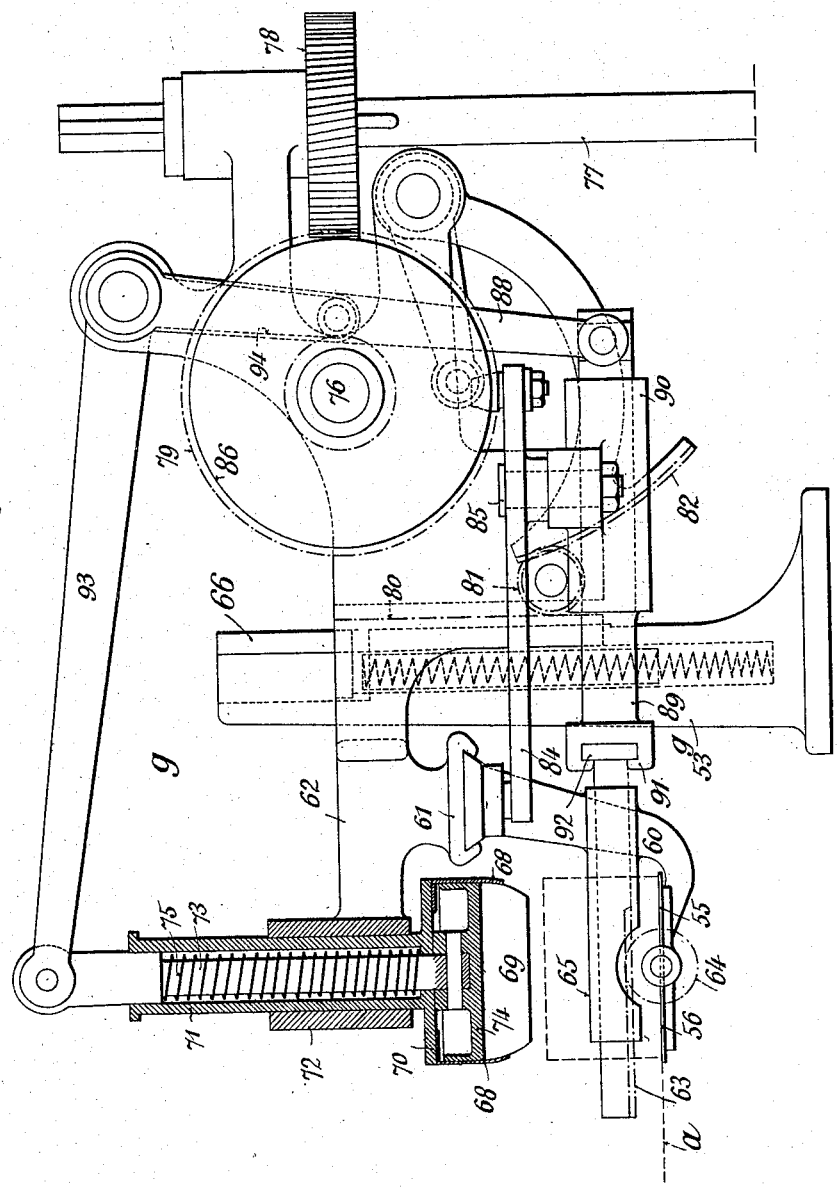
Figure 26:
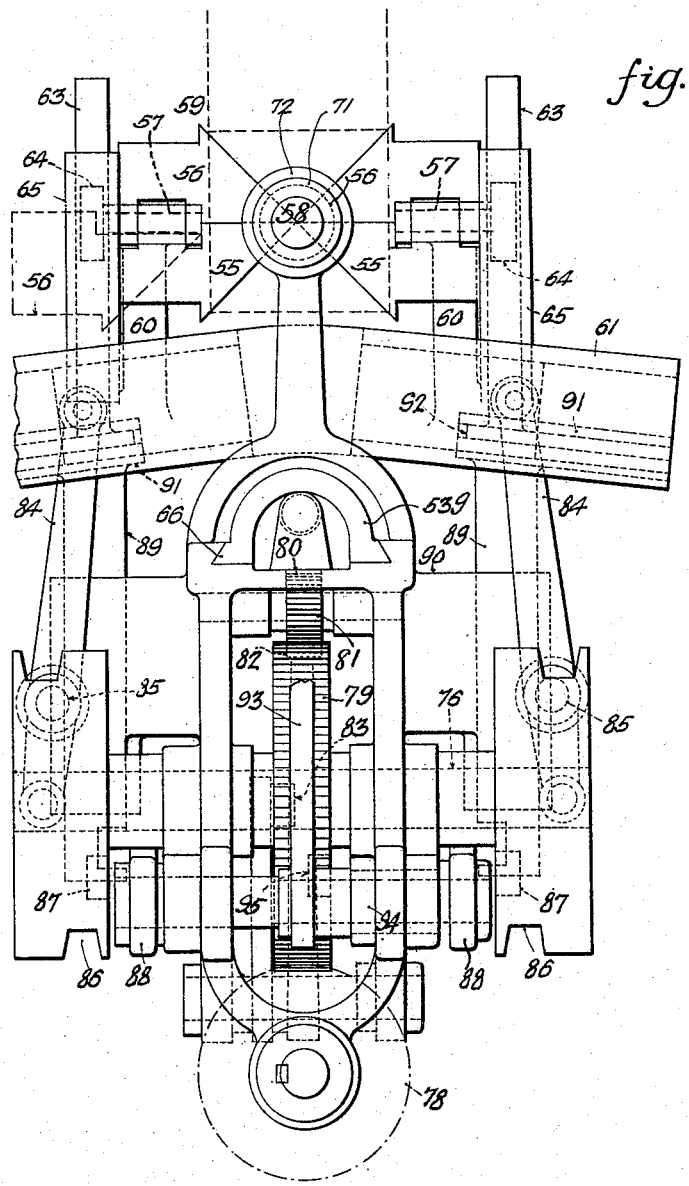
Figure 27:
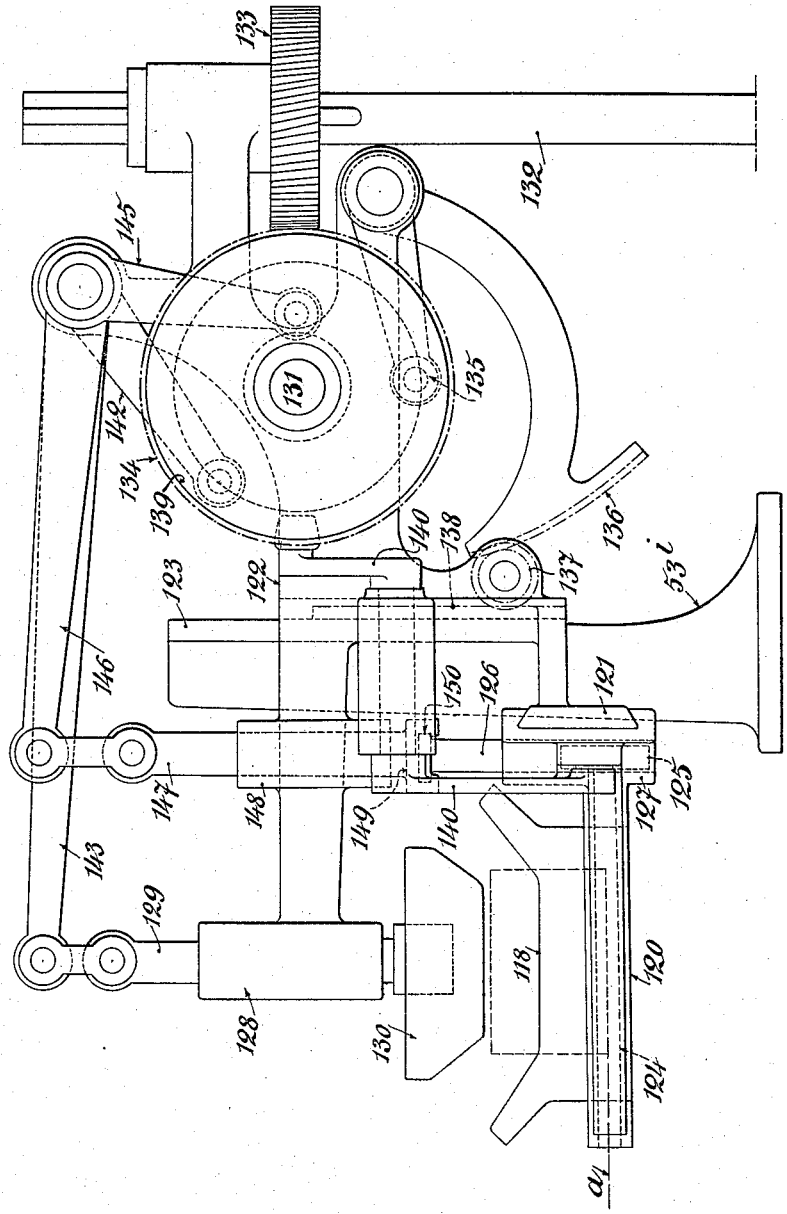
Figure 28:
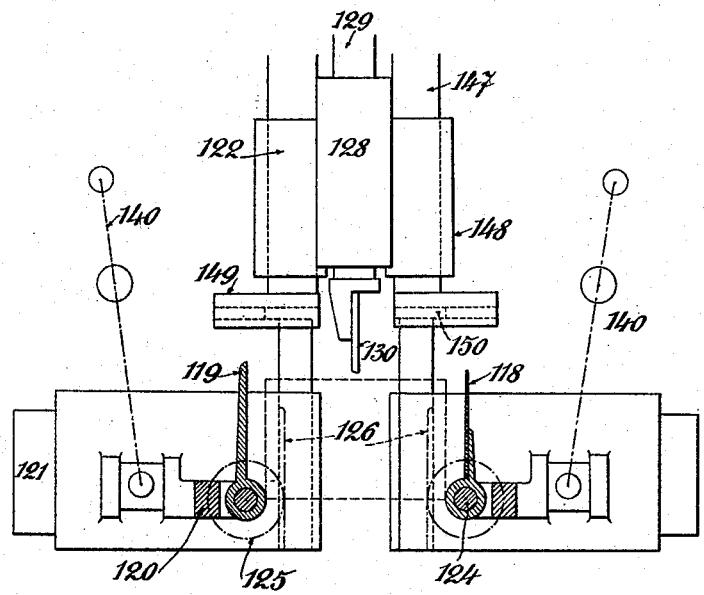
Figure 32:
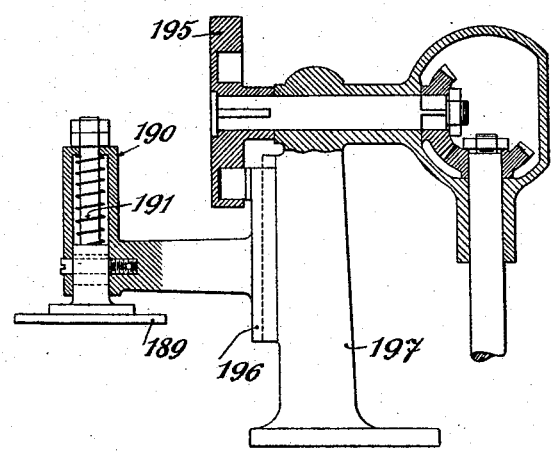

Figure 1, is a front elevation of the improved machine, with certain portions omitted or illustrated diagrammatically. Fig. 1$^a$, represents a prolongation of the structure shown in Fig. 1, the junction line being shown at M—N. Fig. 2, is an end elevation of the machine with certain portions omitted or illustrated diagrammatically. Figs. 3 and 4 are vertical sections of an apparatus for folding a paper sheet into the form of a flat tube. Fig. 5 is an elevation of an apparatus for forming re-entering folds in two sides of the tube. Fig. 6 is a diagram of a folding apparatus mounted on one of the drums of the machine. Figs. 7 to 14 illustrate successive stages in the formation of a paper tube for use in the manufacture of a paper bag with a square bottom. Figs. 15 to 21 illustrate the successive stages in the formation of the square bottom of the bag. Fig. 22 illustrates a flat bag with a hexagonal bottom. Fig. 23, is a view in elevation; partly in section, of the second drum of the machine. Fig. 23$^a$, is a prolongation of the structure shown in Fig. 23, the junction line being shown at O—P. Fig. 24, is a vertical section of the second drum, taken at right angles to Figs. 23 and 23$^a$. Figs. 25 and 26 are respectively an elevation and a plan of an apparatus for effecting the first stage in the folding of the bottom of the bag. Figs. 27, 28 and 29, are respectively an elevation, a partial vertical section, and a plan of an apparatus for effecting the second stage in the folding of the bottom. Figs. 30 and 31 are respectively an elevation and a plan of an apparatus for effecting the third stage in the folding of the bottom. Fig. 32 is a vertical section of a pressing plunger. Figs. 33 and 34 are respectively a vertical section and a plan view of one of the clips on a larger scale.

A and B indicate generally the two drums of the machine which are mounted on two parallel shafts 1 and 2 carried by a framing 3 shown only in part. These drums are caused to rotate intermittently by means of two cams 4 fixed on a cross shaft 5. These cams drive rollers 6 arranged in circles on two plates 7 and 8 fixed on the shafts 1 and 2. The grooves of these cams comprise helical lifting portions and circular portions which produce during each revolution of the two cams an advance and a stoppage of their respective plates.

The drum A carries a set of folding apparatuses of the kind described in my aforesaid patent, for which reason they are shown here only in a diagrammatic manner (Figs. 1, 2 and 6). Each of these two apparatuses comprises two movable blades 9, 10, mounted slidably on supports 11 which are carried by oscillating parallel arms 12, 13; in such a manner as to be capable of executing semi-circular translation movements. These blades sharing these said movements while remaining parallel to one another, are also capable of being moved on their supports at right angles to their planes by means of slides 14.

The oscillating arms are mounted on axles 15 fixed to the plate 16 of the drum 4 and are actuated by means of toothed sectors 17 gearing with pinions 18 fixed to the hubs of the arms 12, 13. These sectors 17 are carried by a crank shaft 19 mounted in the plate 16 and they receive oscillatory motion from a cam (not shown). The supports 11 also carry pressing arms 20, 21, mounted so as to be capable of moving away from and nearer to the blades 9, 10 laterally to the latter for the purpose of allowing the paper sheet a (which is to be folded) to be placed in position. The arms 20, 21 are also capable of movement at right angles to the plane of the blades for the purpose of gripping and releasing the paper sheet. The means for actuating these arms, the constructional details of the blades and of their supports and the means for actuating these parts are not shown, since they are known and do not form part of the present invention.

Various devices carried by the framing of the machine are arranged at b, c, and d around the drum A. The first device has the function of bending by means of blades 22 the sheet a around the blades 9, 10 when the latter are in one and the same plane, in such a manner as to form a flat tube (Fig. 8). The second device serves to form by means of blades 23 reëntering folds in two opposite sides of the tube, for which purpose the blades 9, 10 are caused to face each other and are moved toward each other while the blades 23 are pushed between them (Figs. 2 and 13). The third device (not shown) consists of tongs movable in the axial direction of the drums for the purpose of conveying the paper tubes from the drum A on to the drum B, if desired, the framing carries at p, a device which is similar to that at b, and which serves for folding around the blades 9, 10 a paper sheet intended to form a lining for the interior of the bag.

The constructional details of the blades 22 and the means for actuating them are shown in Figs. 3 and 4. A horizontal shaft 24 with two worms 25 rotates two worm wheels 26 fixed to cams 27 which are mounted on vertical shafts and actuate two parts 28 of inverted T-shape, guided in fixed vertical slideways 29. The horizontal portion of each of the parts 28 has a groove in which a slide block 30 is adapted to slide that is jointed at 31 to a lever 32 provided with a toothed sector 33. The fulcrum 34 of this lever is carried by a support 35 that is adjustably fixed to the frame 36 carrying the slideways 29. In this support 35 there is also mounted a horizontal axle 37 on which are fixed one of the blades 22 and a pinion 38 gearing with the sector 33. At each revolution of the cams 27 the parts 28 rise and fall and cause the sectors 33 to rock in such a manner as to compel the pinions 38 and the blades 22 to make half a revolution alternately in one direction and the other. When these blades 22 are turned outward, a pair of blades 9, 10 supporting a paper sheet a previously gummed on one edge passes down between them so that the sides of the sheet are folded down. At this moment the blades 22 rotate in the direction of the arrows e (Fig. 3) and cause the sides of the sheet to rise against the lower face of the blades and to be stuck to each other so as to form a flat tube having two folds a' (Figs. 7 and 8). At this moment the pressing arms 20, 21 bear against the opposite sides of the said tube and keep them in place on the blades 9, 10 (Fig. 9). Then the blades 22 return into their initial position while the above blades 9, 10 carried along by the plate 16, advance in the direction of the arrow f (Fig. 2), and the following blades 9, 10 carrying a fresh paper sheet, engage in their turn between the blades 22.

The feeding of the sheets a on to the blades 9, 10 at b may be effected by means of any suitable means, for instance marginal devices of the usual type employed in printing machinery. Similar devices may also be provided at p for feeding lining sheets when such are used.

For manufacturing bags of different widths the blades 9, 10 are mounted in a removable manner on their supports 11 and can be replaced by wider or narrower blades. Further the supports 35 may be moved apart from or nearer to each other being for this purpose mounted to slide on a frame 36; they are held in position by a right and left hand screw 39 which merely needs to be turned to move them in opposite directions. The horizontal grooves in the parts 28 are sufficiently long to allow the slide blocks 30 to move freely in them whatever the distance between the supports 36 within the limits provided for.

During the passage of a paper tube from b to c this tube is subjected to a second folding in a manner described in my earlier British Letters Patent No. 22818 of A. D. 1912, by means of the relative movement of the blades 9, 10 each of which is caused to occupy the place of the other by a semi-circular translation movement (Figs. 10 and 11). This movement of the blades 9, 10 is followed by a rearward movement of a quarter revolution so that on arriving at $c$, these blades are situated one in front of the other as indicated in Fig. 12, thereby imparting to the tube the shape of a square prism; the tube has then two fresh folds $a^2$.

The folding apparatus situated at $c$ (Fig. 5) comprises two supports 40 which carry the blades 23 and which are mounted to slide on a fixed frame 41 so that they can be moved nearer to and also away from each other. These supports are connected by joints 42 to bell-crank levers 43 fulcrumed on the frame 41 and actuated by means of a T-shaped part 44. The latter part is movable in slideways 45 in a direction at right angles to the movement of the supports 40 and is actuated by a continuously rotating grooved cam 46 so that at each revolution of this cam the levers 43 rock and impart a to-and-fro movement to the blades 23. These latter blades are moved toward each other at the same time as the blades 9, 10 are moved toward each other so that two reëntering folds $a^3$ are formed in two opposite sides of the tube at the same time as the latter is being flattened (Fig. 13). When the blades 23 are moved apart, the drum A revolves through a further angular distance and the following tube having the form of a square prism, is fed in its turn between them. When the folded tube has arrived at $d$, being still held in the flattened state by the blades 9, 10 it is seized by tongs (not shown) and pulled on to the drum B. This drum (Figs. 23 and 24) consists of a plate 47 carrying at its periphery a series of plates 48 on to which the paper tubes are brought by the aforesaid tongs and are held by movable frames 49. The latter are guided radially by slideways 50 fixed to the plate and subjected to the action of springs 51 which have a tendency to press them against the plates 48. They can be moved away from these plates by means of a cam 52 rotating around the shaft 2 for the purpose of enabling the tubes to be placed upon the drum B and allowing the finished bags to pass out.

Facing the drum B the machine framing is formed with a polygonal portion 53 upon the facets of which are mounted a series of devices $g$, $h$, $i$, $j$, $k$, $l$, for shaping the bottoms of the bags and then ejecting the bags on to an endless conveyer 54.

The device $g$ (Figs. 25 and 26) comprises essentially two symmetrically arranged pairs of blades 55, 56, the blades of each pair being hinged to each other on an axle 57. Each of these blades is of angular shape and its inner side 58—59 is inclined 45 degrees to the hinge. One of the blades 55 of each pair is fixed rigidly on a suspended chair 60 mounted to slide in a slideway 61 fixed to a frame 62. The directions of the two slideways 61 are parallel to the plane of the folded paper tube $a$ and are preferably slightly oblique to the longitudinal axis of the said tube.

The blade 56 is fixed on the axle 57 and can be turned through half a revolution by means of a rack 63 which gears with a pinion 64 fixed on the axle 57 and which slides in a sleeve 65 fixed to the chair 60.

In addition to the movements derived from the to-and-fro motion of the chairs in their slideways 61 and of the racks 63 in their sleeves, the blades 55, 56 receive also motion at right angles to the plane of the tube $a$ due to the to-and-fro motion of the framing 62 along a slideway 66 which is fixed rigidly to the part $53^s$ of the framing of the machine. The weight of the framing 62 and the parts carried by it is balanced by a spring indicated in dotted lines.

Before describing the mechanisms that produce these various to-and-fro movements I shall proceed to set forth their effects. The raising of the framing 62 with the blades and other parts carrried by it allows the tube $a$ to pass under the blades when the drum revolves. When a tube $a$ is brought opposite the device $g$, the framing 62 moves down again, and the blades 55, 56 which are suitably moved apart assume positions on opposite sides of the bag as shown in dotted lines in Fig. 26. The movement of the chairs 60 toward each other has then the result of causing the blades 55, 56 to enter the reëntering angles constituted by the folds $a^1$, $a^3$, $a^2$; these blades are at this moment placed one upon the other. When these blades have thus reached the bottom of the folds $a^3$, their points 58 are situated near each other and near the front edge 67 of the frame 49 that keeps the tube on the plate 48 (Fig. 15). Then on the blades 56 being made to make a half revolution in the direction of the arrows $m$ (Fig. 15) they will compel the upper surface of the tube to fold on to the frame 49 so as to form a fold $a^4$ around the edge 67 at the same time that the folded sides of the tube are set up so as to form around the edges 58, 59 folds $a^5$ and $a^6$ along the diagonals of a square. The end portion of the tube constitutes at this moment a sort of square box having faces $a^7$ and $a^8$. The formation of this box is accomplished by the introduction of a square mandrel of suitable form mounted on the framing 62. This mandrel is provided on its sides with elastic blades 68, 69 the lower portions of which are curved inward while the upper portions are fixed to a plate 70 fixed to a sleeve 71 sliding in a sleeve 72 fixed to the framing 62. A rod 73 extending through the interior of the sleeve 71 carries a square plunger 74 whose sides bear against the blades 68, 69. A spring 75 has a tendency to keep the plate 70 bearing against the plunger in such a manner that the ends of the blades 68, 69 shall be situated underneath the said plunger. Then on depressing this plunger upon the box $a^7$, $a^8$ the inwardly curved blades will engage readily therewith and on their coming to rest near the bottom of the box owing to the upper edge of the sleeve 71 striking the sleeve 72, the spring 75 will yield and the plunger continuing its descent will compel the blades to assume an erect position and form the side edges of the box at the same time as the lower edges of the plunger form the bottom folds $a^9$, $a^{10}$. When the box $a^7$, $a^8$ has been formed in this manner, the mandrel is raised, the blades 55, 56 having been withdrawn to the sides and then raised sufficiently to allow the box to pass underneath and the blades 56 are turned down again on to the blades 55. In order to produce these various movements the movable framing 62 carries a cam shaft 76 which receives continuous rotation from a fixed shaft 77 by means of helical gear wheels 78, 79 one of which is slidable on the shaft 77 and the other is fixed on the shaft 76. The to-and-fro motion of the framing 62 along the fixed slideway 66 is produced by means of a rack 80 fixed to the latter and over which a pinion 81 mounted on the framing 62 is arranged to roll. The rotation of this pinion is produced by a toothed sector 82 which is mounted on the framing 62 and is actuated by the cam 83 of the cam shaft 76.

The to-and-fro motion of the suspended chairs 60 is produced by means of lever 84 fulcrumed at 85 on the framing 62 and actuated by other cams 86 on the shaft 76. The to-and-fro motion of the racks 63 is produced by two cams 87 which actuate through levers 88 two slide blocks 89 working in slideways 90 fixed to the framing 62. These slide blocks carry slideways 91 which are parallel to the slideways 61 of the chairs and in which work slide-blocks 92 fixed to the racks 63. By these means the to-and-fro motion of the slide blocks 89 is transmitted to the racks 63 irrespectively of the mutual nearness or distance apart of the pairs of blades 55, 56, and the to-and-fro motion of the chairs 60 in their slideways 61 has no effect upon the actuation of the racks 63 nor consequently upon the rotation of the blades 56. The rising and falling motion of the plunger 74 is produced by means of a bell-crank lever 93, 94 actuated by a cam 95 likewise fixed on the shaft 76. This manner of actuation makes the device $g$ a compact and independent mechanism. The folding devices $i$ and $j$ are actuated in an analogous manner.

The apparatus $h$ has the function of applying to one of the surfaces $a^8$ of the paper box a drop of paste for connecting it later on to the opposite surface $a^8$; it also serves for introducing, if necessary, into the bottom of the box a square of cardboard $n$ for reinforcing the bottom of the bag. For this purpose an arm 96 carried by a shaft 97 (Fig. 23) receives oscillatory movement which brings a roller 98 mounted on its movable end into contact alternately with a paste roller 99 and the surface $a^8$ of the paper bag. The paste contained in a trough 100 is conveyed to the roller 99 by a roller 101 revolving in contact therewith. The mechanism for oscillating the arm 96 and revolving the rollers 99 and 101 is not shown.

The apparatus $h$ comprises further a device for distributing pieces of cardboard comprising a fixed table 102 on which slideways 103 guide a slide 104 having an alternating movement. This slide has a thickness equal to that of a piece of cardboard, and at each stroke pushes back the bottom piece of a pile of cardboard pieces $n$ which are situated loosely between vertical guides 105. The cardboard piece which is thus pushed back drops between the four blades 106 of a square mandrel similar to that of the apparatus $g$; one of these blades has a slit for the passage of the cardboard piece pushed by the slide.

The plate 108 carrying the blades 106 is supported by a sleeve 109 guided in a sleeve 110 fixed to the framing 111 of the table 102; it is normally kept pressed by a spring 112 against a plunger 113 whose rod extends inside the sleeve 109 and is connected to an actuating lever 114. Continuously rotating cams 115 drive levers 116 and 117 connected respectively to the slide 104 and the lever 114. At the moment when the plunger 113 is at the top of its stroke a cardboard piece $n$ is pushed under it by the slide and is held by friction between the blades 106. The tube $a$ being brought under the mandrel with the aperture of its box $a^7$, $a^8$ uppermost, the lever 114 descends so that the blades 106 whose lower parts are incurved, engage in the box, and when these blades are stopped by the contact between the upper edge of the sleeve 109 and the sleeve 110, the plunger 113 will continue to descend compressing the spring 112, and will force the cardboard piece $n$ between the blades 106 until it drops to the bottom of the box. The plunger and the blades are then raised while the slide 104 moves behind the next following cardboard piece $n$.

The application of the drop of paste by the roller 98 takes place while the mandrel is engaged in the box $a^7$ $a^8$ and is supporting the sides of the latter. The tube $a$ on arriving at $i$ is subjected to the action of blades 118 and 119 (Figs. 27, 28, 29) serving to fold the sides of the box $a^7$ $a^8$ down on to its bottom and one upon the other. These blades are jointed to supports 120 which are mounted to slide along a slideway 121 so that they can be moved away from and nearer to each other symmetrically on the sides of the tube $a$. The slideway 121 is fixed to a framing 122 which is itself adapted to slide along a slideway 123 fixed rigidly to the part 53 of the machine framing so that the blades 118, 119 can be raised to admit a box $a^7$, $a^8$ being passed beneath them, and then lowered to the level of the tube $a$. The shaft 124 on which each blade 118 or 119 is fixed carries a pinion 125 gearing with a rack 126 which slides in a sleeve 127 fixed to the respective support 120. The extent of movement of the racks 126 is sufficient to turn the blades 118, 119 through half a revolution.

In a sleeve 128 fixed to the framing 122 there is guided a rod 129 carrying a blade 130 parallel to the longitudinal axis of the tube $a$. In engaging downwardly in the box $a^7$ $a^8$ the blade 130 pushes outward by its inclined edges the middles of the opposite sides $a^7$ and facilitates the folding by starting the folds $a^{11}$ as indicated in dotted lines in Fig. 18.

The mechanism for actuating the supports 120, the racks 126, the blade 130 and the framing 122, is similar to that of the apparatus $g$. It comprises a cam shaft 131 mounted in the framing 122 and receiving through helical gear wheels 133, 134 continuous rotary motion from a shaft 132. This shaft 131 carries a cam 135 which actuates the framing 122 by means of a sector 136, a pinion 137 and a rack 138 in the manner hereinbefore described, two cams 139 which actuate the supports 120 by means of rocking levers 140, a cam 141 which actuates the blade 130 by means of a lever 142, 143 connected to the rod 129, and two cams 144 which actuate the racks 126 by means of levers 145, 146 connected to slide blocks 147 working in sleeves 148 fixed to the framing 122. The lower ends of these slide blocks 147 are provided with slideways 149 parallel to the slideway 121, and the upper ends of the racks 126 terminate in slide blocks 150 working in the slideways 149.

The mechanism operates as follows:—The framing 122 having been raised, a tube $a$ is brought by the rotation of the drum B under the blade 130; the framing 122 then moves down with the supports 120 situated apart and the blades 118, 119 folded downwardly and outwardly, until the latter are situated in the plane of the tube $a$. The blade 130 is then lowered in such a manner as to start the oblique folds $a^{11}$. Then the blades 118, 119 are turned in the direction of the arrows $o$ by the descent of the racks 126, so that they compel the sides $a^8$ to fold down on to the bottom. The movements of the blades are regulated in such a manner that the previously pasted side $a^8$ folds down a little before the opposite side. The blade 118 is so shaped as to leave the pasted portion uncovered in order that the opposite side $a^8$ shall be pressed against it by the blade 119. It is to be understood that the blade 130 is raised before the sides $a^8$ are entirely folded down. When the sides of the box $a^7$ $a^8$ have thus been folded to constitute the bottom of the bag as indicated in Fig. 19, the blades are again turned outward and moved apart from each other and raised sufficiently to allow a fresh box $a^7$, $a^8$ to pass under them. The preceding box is then brought to the apparatus $j$ by passing first under a pasting finger 151 which places a drop of paste on the middle of the bottom of the bag. For this purpose the finger 151 turns on a fixed axle 152 in such a manner as to come in contact successively with the bottom of the bag and a roller 153 which is supplied with paste by a roller 154 dipping in a paste box 155.

The mechanism for producing the rotation of the rollers 153, 154 and the finger 151 is not shown:—it consists of a set of gear wheels driven by a wheel fixed on one of the shafts 1 or 2 so that it revolves intermittently in agreement with the drums.

The folding apparatus $j$ (Figs. 30 and 31) comprises two blades 156, 157 which serve to fold inward the two angular portions of the bottom of the bag in such a manner as to make said bottom square as indicated in Figs. 20 and 21. It also comprises a pressing plate for forming the folds $a^{12}$ at the base of these two angular portions. The blades 156, 157 must be capable of rising so as to allow the bag to pass underneath them, and then of descending to the level of the bag, of sliding in their plane for passing underneath the angular portions of the bottom of the bag, and then of turning through half a revolution for folding the said portions down upon the middle of the bottom. For this purpose they are hinged to supports 159 sliding along a slideway 160 parallel to the axis of the bag. This slideway is fixed to a movable framing 161 sliding on a fixed slideway 162 bolted to the part 53 of the machine framing. The shafts 163 of the two blades are provided with pinions 164 gearing with toothed sectors 165 whose axles are carried by the supports 159. These sectors are jointed to slide blocks 166 working in a slideway 167 fixed to a rod 168 sliding in a sleeve 169 so that the to-and-fro motion of this rod causes the sectors to rock and the blades to make half a revolution in one or the other direction. The movable framing 161 carries also a sleeve 170 in which a rod 171 slides that carries a plate 172 which is dimensioned to suit the square bottom to be formed, and is hollowed out on its underside so as not to bear upon the pasted portion of the bottom of the bag.

The mechanism for actuating the framing 161, the supports 159, the slideway 167 and the plate 172 is similar to that of the devices $g$ and $i$; it comprises a cam shaft 173 mounted in the framing 161 and receiving continuous rotary motion from a shaft 174 by means of helical gear wheels 175, 176. The shaft 173 carries a cam 177 actuating the framing 161 by means of a sector 178, a pinion 179 and a rack 180 in the manner hereinbefore described; it also carries a cam 181 for actuating the supports 159 by means of rocking levers 182, 183, 184, a cam 185 actuating the rod 171 of the plate 172 by means of a lever 186, and a cam 187 for actuating the rod 168 of the slideway 167 by means of a lever 188. When the framing 161 is raised, a bag $a$ is brought by the rotation of the drum B underneath the plate 172 and the blades 156, 157. These blades being turned outwardly and suitably moved apart are then depressed to the level of the bag and then moved nearer to each other so that they slide under the angular portions of the bottom of the bag (Fig. 20) at the same time as the plate 172 is lowered on to the central portion of the bag. The blades are then moved up again into an almost upright position, raising the angles of the bottom and thus forming the folds $a^{12}$ around the edges of the plate. The plate 172 is then raised and the blades continue their inward folding down movement in such a manner as to apply the angular portions upon the previously pasted bottom of the bag (Fig. 21). The framing 161 then rises with the blades which fold down outwardly and move apart again, while a fresh partial rotation of the drum B brings the bag to $k$ (Fig. 23) in front of a pressing plunger 189 which has the function of finally crushing the folds of the bottom of the bag and securing the adhesion of the pasted portions. The rod of this plunger works in a movable sleeve 190 receiving to-and-fro motion from a continuously rotating cam 195 which acts upon a slide block 196 that carries the sleeve 190 and slides on a fixed guide 197. A spring 191 is interposed between shoulders of the sleeve and the plunger rod for the purpose of providing the necessary elasticity. The finished bag is then brought to $l$ and is seized by tongs 192 and drawn by them from the drum B as soon as the frame 49 is pushed back by the cam 52 to release the bag. Suitable tongs 192 allow the bag to drop on to the endless conveyer 54 which conveys the bags underneath a pressing apron 193 that subjects them to a pressure of suitable duration and intensity for insuring the permanent adhesion and maintenance of their parts.

The tongs, 192, Figs. 33 and 34, consist of two jaws, 198, 199, jointed to the axes, 200, 201, which are carried by a slidable rod 202. Such jaws are provided with projections 203, 204, extending toward one another and connected with one another by an axis 205, which is mounted rotary in one of the projections and engaged slidable in a radial slot in the other projection; such connection has the effect of causing both the jaws to swing simultaneously in inverse direction. The jaw 198 is also provided with a stem 206 which a spring 207 tends to hold applied onto a part 208 of the rod 202, thus maintaining the tongs closed; such stem is provided with a cam projection 209 which, on the reciprocatory motion of the rod 202, strikes dentments (not shown), thus causing the jaws to open against the influence of the spring 207. The tongs $192^a$ are similar to the previous one and carry a rod $202^a$ parallel to the rod 202. These two rods are carried by a support 210 slidable in a slide-way 211 parallel to the axis of the drums, A and B.

194 is a counter arm which is oscillated each time the drums have made a determined number of revolutions in such a manner as to change each time the position of a bag on the conveyer whereby the finished bags can be counted quickly.

For the purpose of facilitating the various foldings hereinbefore described, it is advisable to subject each paper tube at the point $d$ where it arrives on the drum B to the pressure of a plunger which is similar to the one shown in Fig. 32, but which has on its working face a series of ribs or of grooves corresponding to the folds to be made, while the corresponding part of the plates 48 of the drum is provided with grooves or ribs constituting counterparts of those on the plunger.

The improved machine allows of making bags of varying sizes without other change than the replacing of certain blades 9, 10, 22, 118, 119, 156 and 157, the mandrel situated at $h$, the plate situated at $j$, and the plunger situated at $k$ by other blades, and another mandrel plate and plunger of other widths. This changing of the parts does not take up much time. The actuating mechanisms hereinbefore described are designed indiscriminately for the manufacture of bags of all widths within determined limits. The improved machine is also adapted to make bags $a^x$ of a similar type of folding such as that shown in Fig. 22. In this case the formation of the folds $a^2$ and $a^3$ is not required, and each of the pairs of blades movable one relatively to the other, can be replaced by a single blade of double width mounted rigidly on the drum A, and the folding device $c$ may be omitted. The folding devices $g$ $h$ $i$ $j$ may also be replaced by similar devices adapted to be fixed on the faces of the polygonal support 53 without having to change the drum B in any way.

Claims.

1. A machine for the manufacture of paper bags comprising two rotary drums the axes of which are placed parallel to one another, means for revolving such drums intermittently, a set of folding devices mounted on one of the drums and adapted to transform the sheets of paper into flat tubes, a set of pinching devices mounted on the second drum and adapted to catch and convey paper tubes, means whereby to pass the paper tubes from the first drum to the second one where the folding devices of the first drum lie in front of the pinching devices of the second drum on a line parallel to the direction of the axes of the drums, and a set of folding devices placed around the second drum and adapted to fold the paper tubes in the shape of bags.

2. In a machine for the manufacture of paper bags, the combination of two rotary drums the axes of which are parallel to one another, folding members on the first drum, conveying members on the second drum, and a slidable clip (192$^a$) adapted to catch and take away the paper tubes from the folding members on the first drum and to bring the same in a direction parallel to the axes of the drums to the conveying members on the second drum, substantially as described.

3. In a machine for the manufacture of paper bags, the combination of a stationary main frame (3), a rotary plate (16), a series of pairs of shutters (9, 10) on such plate, means whereby to move the shutters of each pair the one relatively to the other in keeping the same always parallel to one another, shutters (22) mounted on the main frame and adapted to allow the passage between them of the pairs of shutters on the rotary plate, and means to turn such shutters (22) in such a manner that they are applied against the shutters (9, 10) on the rotary plate, substantially as described.

4. In a machine for the manufacture of paper bags, the combination of a main frame (36) having a horizontal slide-way and two vertical slide-ways, movable bearings (35) on the horizontal slide-way, means to bring together and to separate such bearings, axes (34 and 37) mounted on each of such bearings, a folding shutter (22) and a pinion (38) on each axis, a lever (32) on each axis (34), a toothed sector (33) on each lever (32) engaging with the respective pinion (38), slidable pieces (28) movable in the vertical slide-ways and adapted to move the said levers (32), and means on the main frame to move the said slidable pieces (28), substantially as described.

5. In a machine for manufacturing paper bags, the combination of a main stationary frame, a rotary member 47, a plurality of plates secured to the periphery of said member 47 substantially at right angles to the plane of movement of the same, pinching members 49 radially disposed and slidably mounted on the member 47 and adapted to jam the paper tubes onto the plates 48, a cam 52 adapted to actuate the pinching members 49, and a set of folding devices mounted on the main frame and adapted to fold the tubes held between the plates 48 and the pinching members 49.

6. In a machine for manufacturing paper bags, the combination of a main stationary frame, a rotary member, pinching members at the periphery of such rotary member adapted to pinch and convey the folded paper tubes, a set of radially movable folding members mounted on the main frame and adapted to fold the tubes held by said pinching members, and means for moving said folding members radially.

7. In a machine for the manufacture of paper bags, the combination of a main frame (62) having slideways (61) extending obliquely so as to form a very obtuse or open V, two bearings (60) movable on such slide-ways, folding shutters (55 and 56) mounted rotary on such bearings, the axes of rotation of the said shutters placed in prolongation one of the other and means on the main frame (62) to give to the said bearings reciprocatory motions and rotary motions to the said shutters, such shutters being of angular form and designed to be inserted in the folds or lateral bellows of a paper tube, substantially as described 8. In a machine for the manufacture of paper bags, the combination of a stationary main frame (53) having a vertical slide-way (66) and a vertical rack (80), a main frame (62) movable on such slide-way, a pinion (81) mounted on such movable main frame and meshing with the said rack, folding means such as shutters, pistons and the like, mounted on the movable main frame, a cam shaft (76) mounted on the movable main frame, means actuated by such cam shaft to turn or revolve the said pinion and to move the said folding means, and controlling means adapted to actuate continuously the said cam shaft in following the movements of the movable main frame, substantially as described.

9. In a machine for the manufacture of paper bags, the combination of a stationary main frame having a vertical slide-way (66) and a vertical rack (80) a movable main frame (62) on the said slide-way, a pinion (81) mounted on the movable main frame and meshing with the said rack, horizontal slide-ways (61) on the movable main frame, bearings (60) slidable in such slide-ways (61) shutters (55 and 56) mounted rotary on such bearings, pinions (64) associated with the shutters, racks (63) slidable on the said bearings (60), a cam shaft (76) mounted on the movable main frame (62), means on the said movable main frame and actuated by the said cam shaft to revolve the said pinion (81) and to reciprocate the said bearings (60) in the slide-ways (61) and the said racks (63) on the said bearings (60), substantially as described.

10. In a machine for the manufacture of paper bags, the combination of a rectangular plate (70), spring blades secured to the sides of the said plate and extending downwardly, such blades being vaulted interiorly and downwardly, a rectangular piston (74) placed between the blades and adapted to engage their vaulted parts, and means whereby to raise and lower such piston in regard to the plate, substantially as described.

11. In a machine for the manufacture of paper bags, the combination of a rectangular piston (113) a rectangular mandrel around such piston, the said mandrel having four blades (106) downwardly convergent and one of such blades having a slit (107) for the insertion of a sheet of cardboard, means whereby to raise and lower the said piston and the said mandrel and means to insert laterally the sheets of cardboard through the said slit, substantially as described.

12. In a machine for manufacturing paper bags, the combination of two rotary drums having their axes parallel to one another, a plurality of sets of folding members on the first drum, a plurality of conveying members on the second drum, and means mounted independently of each drum adapted to engage and remove the paper tubes from the folding members on the first drum and carry the same in a direction parallel to the axes of the drums to the conveying members on the second drum.

13. In a machine for manufacturing paper bags, the combination of a frame, a rotary member 47, a plurality of plates 48 secured to the periphery of said member 47 substantially at right angles to the plane of movement of the same, pinching members 49 radially disposed and slidably mounted on the member 47 and adapted to jam the paper tubes onto the plates 48, means for normally holding the pinching members in contact with the plates 48, a cam adapted to release the pinching members 49, and means for folding the tubes held between the plates 48 and the pinching members 49.

In testimony, that I claim the foregoing as my invention I have signed my name in presence of two subscribing witnesses.

JEAN BARDET.

Witnesses:
HUNSON C. COXE,
MAURICE ROUX.

Copies of this patent may be obtained for five cents each, by addressing the "Commissioner of Patents, Washington, D. C."